J. GUNN.
STEAM TRAP.
No. 32,132.
Patented Apr. 23, 1861
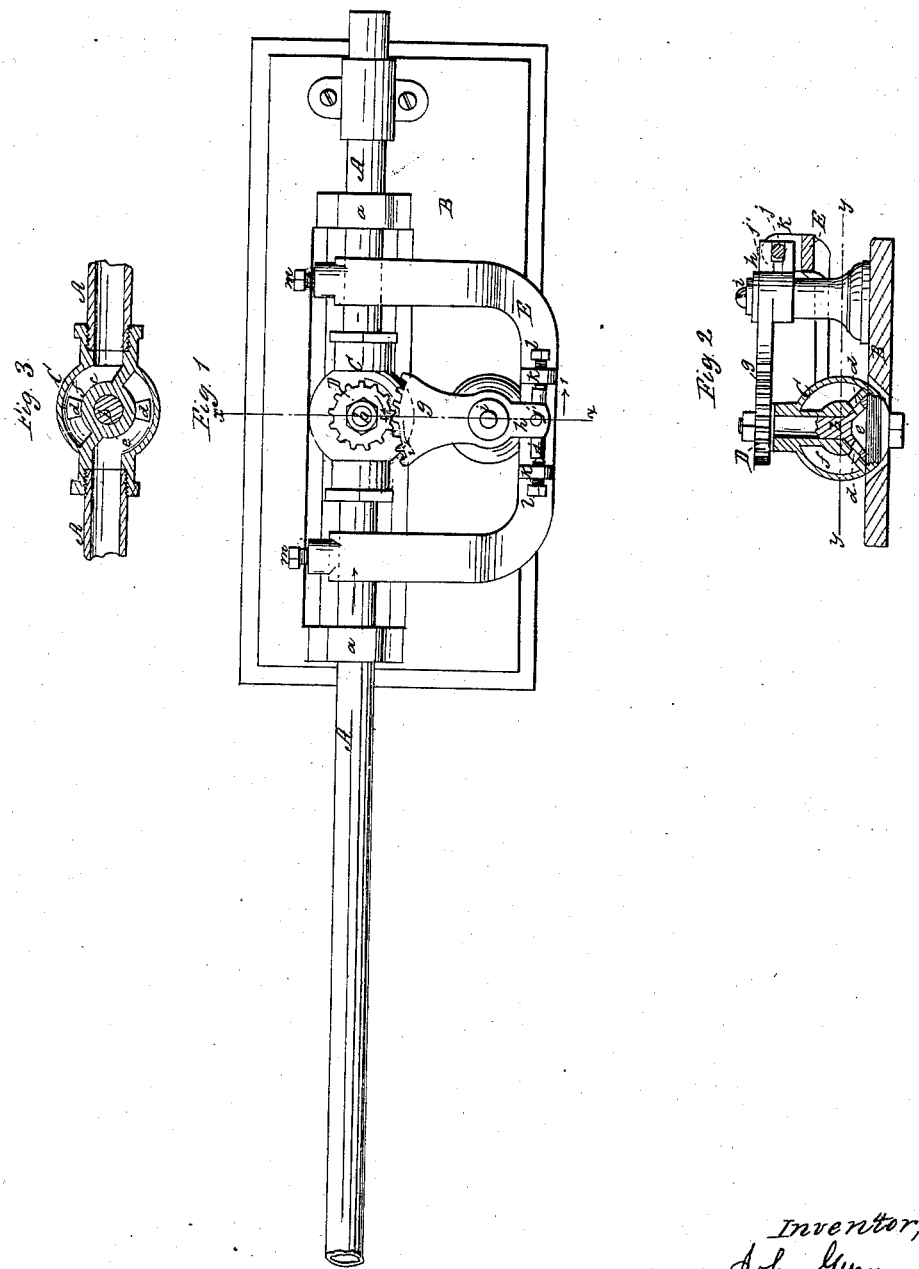

UNITED STATES PATENT OFFICE.

JOHN GUNN, OF WORCESTER, MASSACHUSETTS.

STEAM-TRAP.

Specification of Letters Patent No. 32,132, dated April 23, 1861.

*To all whom it may concern:*

Be it known that I, JOHN GUNN, of Worcester, in the county of Worcester and State of Massachusetts, have invented a new and Improved Steam-Trap; and I do hereby declare that the following is a full, clear, and exact description of the same, reference being had to the accompanying drawing, forming part of this specification, in which—

Figure 1, is a front elevation of my invention. Fig. 2, is a transverse vertical section of the same, the line $x$ $x$ Fig. 1, indicating the plane of section. Fig. 3, is a horizontal section of the same, taken in the plane indicated by the line $y$ $y$, Fig. 2.

Similar letters of reference in the three views indicate corresponding parts.

All the steam traps heretofore made, in which the expansion and contraction of the pipe serves to operate the valve or valves, are constructed with butt valves, which are forced against their seats when the pipe expands, and which are removed from their seats as the pipe contracts. The use of such valves creates a serious difficulty because the impurities which are carried through the pipes by the current of steam are liable to form a sediment on the valve or valve seat so that it is impossible to close the valve tight and the effect of the steam trap is spoiled. This difficulty I have obviated by the use of a rotary valve, which is operated by the expansion and contraction of the pipe carrying the condensed water from the steam heater. The motion of this valve is multiplied and its effect improved by the action of a two armed lever, the long arm of which forms a toothed segment, gearing into a pinion on the valve stem, whereas its short arm is operated upon by a frame attached to the pipe and moved by the expansion and contraction of the same in such a manner that the motion of the valve is increased according to the proportion existing between the two arms of said lever.

To enable those skilled in the art to make and use my invention, I will proceed to describe its construction and operation with reference to the drawing.

The pipe A, which connects with the heating apparatus and which is intended to carry off the condensed water, slides freely in a longitudinal direction in the loops or eyes $a$ which are secured to the bed plate B. The two ends of this pipe are attached to the valve C which regulates the discharge of the steam and condensed water; and which is situated between the two eyes $a$ as clearly shown in Fig. 1 of the drawing, so that said valve moves backward and forward as the pipe A contracts or expands.

The valve is constructed with a plug $b$ which rotates under a seat $c$ and apertures $d$ in the plug and seat form a communication between the two compartments $e$, $f$, of the valve. One of these compartments communicates with one and the other with the other end of the pipe A so that when the apertures in the plug, register with those in the seat of the valve, the two ends of the pipe communicate with each other, and the water or steam which enters into said pipe from one end discharges through the other.

The valve is operated by a pinion D which is secured to the outer end or stem of the plug $b$ and which gears into the toothed edge of the long arm $g$, of a double armed lever $g$, $h$, which serves to multiply the motion of the valve as will be presently explained. If this lever was fixed firmly to the bed plate B, the length of the arc which measures the rotary motion imparted to the plug of the valve, would be equal to the motion of the pipe in a longitudinal direction, that is to say if the circumference of the pitch-circle of the pinion D is equal to two inches, the pipe A would have to expand or contract one inch in order to produce half a revolution of the plug of the valve in one direction or in the other. Such an arrangement would be ineffective in practice, because the actual expansion and contraction of the pipe A would not be sufficient to open and close the valve. It has therefore been necessary to arrange the lever $g$ $h$ in such a manner, that by its action the motion of the valve is multiplied and that a small expansion or contraction of the pipe is sufficient to close or to open the valve. To effect this purpose the lever $g$, $h$, is secured to the bed plate B by means of a pivot $i$ and its toothed arm $g$ is a multiple of the arm $h$ so that a small motion of the short arm $h$ in one direction produces a comparatively large motion of the long arm $g$. The arm $h$ is secured by a pivot $j'$, to a bar $j$, which is adjustable between two lugs $k$, by means of set screws $t$, and the lugs $k$ rise from the frame E, that is firmly secured to the pipe A by means of set screws m.

When the pipe A expands, the frame E together with the valve moves in the direction of the arrow marked upon it in Fig. 1. This motion causes the short arm h of the lever g, h to move in the direction of arrows 1, and the toothed arm g of said lever is thrown in the direction of arrow 2, causing the pinion D and with it the plug of the valve to move in the direction of arrow 3. If the length of the pipe increases one eighth of an inch and if the circumference of the pitch-circle of the pinion D is two inches, this expansion of the pipe would cause the pinion to make one sixteenth of a revolution, if the segmental arm g of the lever g h would be held stationary. But the frame E being rigidly attached to the pipe A, moves with the same, causing the pivot j' which secures the arm h of the lever g, h, to the bar j, to make a motion of one-eighth of an inch, in the direction of arrow 1, and if the distance of the center of the pivot j', from the fulcrum of the lever g h is equal to one third of the radius of the pitch-circle of the toothed segment g, the latter will make a motion of three eighths of an inch in the direction of arrow 2. This motion is transmitted to the pinion D, and when it is added to the original motion of said pinion it will be seen that an expansion of the pipe of one eighth of an inch, produces a motion of four eighths or one quarter of a revolution of the pinion. From this explanation it will be easily understood, how by the action of the lever g, h and pinion D, a small change in the length of the pipe A is made to produce a comparatively large motion of the valve and it is obvious that instead of the pinion D, a simple arm might be used which would have to be connected in the proper manner to the long arm of the lever g h or a small pulley might be attached to the stem of the valve with a cord passing around it having its two ends secured to the long arm of the lever g, h. All such arrangements would be mechanical equivalents of the toothed segment and pinion, which would produce precisely the same effect.

The position of the valve C is so regulated that when the pipe A is cold it is wide open; but when the steam passes through said pipe causing it to heat and to expand, the valve C is gradually closed by the action of the lever g h and pinion D, and when the temperature of the pipe reaches a certain limit, the valve is closed entirely. When this takes place, the steam condenses, and the pipe cools off, so that the valve opens and the condensed water is allowed to escape.

This steam trap is very sensitive in its operation and the valve is easily kept tight, since the impurities which may find their way into the pipe, have no chance to settle on its working surfaces.

Having thus fully described my invention, what I claim as new and desire to secure by Letters Patent is,

1. The employment or use of a rotary valve C, in combination with the expanding and contracting pipe A, substantially in the manner and for the purposes shown and described.

2. The arrangement of the pinion D and lever g, h or their equivalents in combination with the frame E, pipe A and valve C, constructed and operating substantially in the manner and for the purposes specified.

JOHN GUNN.

Witnesses:
 JOHN E. WASHBURN,
 GEORGE H. TUFTS.